United States Patent
Thodeti et al.

(10) Patent No.: US 12,315,287 B2
(45) Date of Patent: May 27, 2025

(54) OPTICAL FINGERPRINT SCANNER AND METHOD FOR DETECTING OPTICAL COHERENT GATING LIVENESS

(71) Applicant: MANTRA SOFTECH INDIA PRIVATE LIMITED, Gujarat (IN)

(72) Inventors: Satish Mallaiah Thodeti, Gujarat (IN); Haresh Kalubhai Khadsalia, Gujarat (IN); Hiren Kishor Bhandari, Gujarat (IN)

(73) Assignee: MANTRA SOFTECH INDIA PRIVATE LIMITED, Gujarat (IN)

( * ) Notice: Subject to any disclaimer, the term of this patent is extended or adjusted under 35 U.S.C. 154(b) by 0 days.

(21) Appl. No.: 18/685,389

(22) PCT Filed: Aug. 20, 2022

(86) PCT No.: PCT/IN2022/050751
§ 371 (c)(1),
(2) Date: Feb. 21, 2024

(87) PCT Pub. No.: WO2023/026300
PCT Pub. Date: Mar. 2, 2023

(65) Prior Publication Data
US 2024/0395066 A1    Nov. 28, 2024

(30) Foreign Application Priority Data

Aug. 21, 2021    (IN) .............................. 202121037929

(51) Int. Cl.
*G06V 40/13*    (2022.01)
(52) U.S. Cl.
CPC ................................. *G06V 40/1324* (2022.01)
(58) Field of Classification Search
CPC ............ G06V 40/1324; G01B 9/02091; G01B 9/02041
See application file for complete search history.

(56) References Cited

U.S. PATENT DOCUMENTS 6,185,319 B1 *    2/2001   Fujiwara ............ G06V 40/1324
                                                          356/71
11,531,756 B1 *  12/2022   Raguin ................ G06V 40/166
(Continued)

FOREIGN PATENT DOCUMENTS

DE        102015005370 A1    11/2016

OTHER PUBLICATIONS

English Machine Translation of Abstract for DE 102015005370 A1 (2016).
(Continued)

*Primary Examiner* — Yuzhen Shen
(74) *Attorney, Agent, or Firm* — Caesar Rivise, PC

(57) ABSTRACT

The present invention relates to an optical fingerprint scanner (3) optics for coherent gating liveness detection involving a second prism to form Zero path difference Michelson interferometer, which forms the image of internal finger surface with the concept of coherent gating image detection. The present invention illustrates the detection of external surface and internal surface of the finger (4) and also provides the clue regarding the liveness detection through coherent gating. The present invention provides a cheap and less complex optical configuration for anti-spoof biometric finger or palm print scanner by using the coherent gating image technique of the Optical Coherence Tomography (OCT). The present invention also provides a lesser data analysis in computation as compared to multi spectral and stereo 3 D optical imaging techniques for anti-spoof finger or palm print analysis.

3 Claims, 1 Drawing Sheet

(56) References Cited

U.S. PATENT DOCUMENTS

| | | | |
|---|---|---|---|
| 2005/0094128 A1* | 5/2005 | Carver | G06V 40/1324 356/71 |
| 2005/0249390 A1* | 11/2005 | McClurg | G06V 40/1324 382/127 |
| 2012/0121143 A1* | 5/2012 | Lee | G06V 40/1324 382/125 |
| 2017/0169282 A1* | 6/2017 | Hogan | G06V 40/1324 |
| 2018/0060639 A1* | 3/2018 | Lee | G06V 40/13 |

OTHER PUBLICATIONS

International Search Report from PCT/IN2022/050751 mailed Nov. 25, 2022.

* cited by examiner

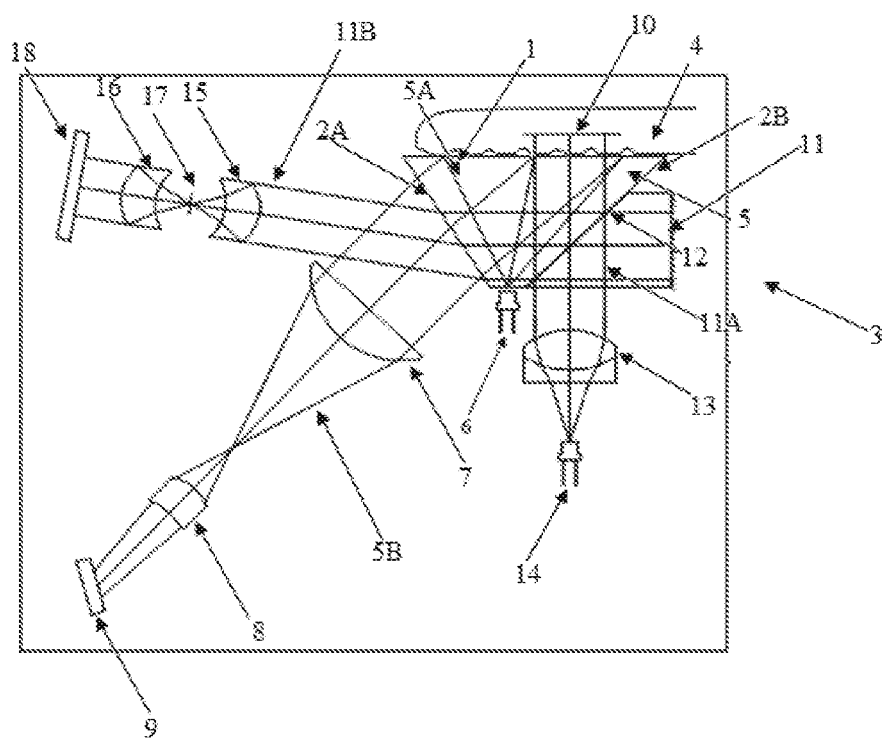

OPTICAL FINGERPRINT SCANNER AND METHOD FOR DETECTING OPTICAL COHERENT GATING LIVENESS

CROSS-REFERENCE TO RELATED APPLICATIONS

This application is a U.S. National Phase Application of PCT/IN2022/050751, filed Aug. 20, 2022, which claims priority to IN 202121037929, filed Aug. 21, 2021, the contents of which applications are incorporated herein by reference in their entireties for all purposes.

FIELD OF THE INVENTION

The invention relates to an optical fingerprint scanner having an additional prism termed as a second prism to form Zero path difference providing the image of internal finger surface with concept of coherent gating image detection.

BACKGROUND OF THE INVENTION

Biometrics is the Science and technology of authentication (i.e. establishing the identity of an individual) by measuring the person's physiological or behavioral features. The term is derived from the Greek words "bios' for life and "metron" for degree.

In information technology, biometrics usually refers to technologies for measuring and analyzing human physiological characteristics such as fingerprints, eye retinas and irises, voice patterns, facial patterns, and hand measurements; especially for authentication purposes.

In a typical biometric system, a person registers with the system when one or more of their physiological characteristics are obtained, processed by a numerical algorithm, and entered into a database. Ideally, when the person logs into the system at a later time all of their features match. If someone else tries to log in as the same person, their biometric information does not fully match, so the system will not allow them to log in.

Among all the biometric techniques, fingerprint-based identification is one of the oldest and most accurate methods which has been successfully used in numerous applications. Everyone is known to have unique, immutable fingerprints. A fingerprint is made of a series of ridges and furrows on the Surface of the finger. The uniqueness of a fingerprint can be determined by the pattern of ridges and furrows as well as the minutiae points. Minutiae points are local ridge characteristics that occur at either a ridge bifurcation or a ridge ending. To implement fingerprint-based identification, an image or imprint of the fingerprint has to be acquired. Similarly, an image of any uniquely identifiable skin Surface can be used for identification. In addition to a single fingerprint, multiple fingertip images can be used for this purpose. In addition, images of the palm or the entire hand can be used as biometric identifiers.

One such technology has been disclosed in U.S. Pat. No. 3,357,299 B1 that relates to a light projection system which are accomplished in a projection system employing a light modulating control medium having a first surface and an opposing base surface, said first surface providing a boundary between said control medium and a second medium having a index of refraction lower than said control medium. Light emitted from a light source is transmitted through the base surface of said recording medium at an angle which provides selective internal reflection of said light at said boundary in accordance with the modulations of said medium. The reflected light which may contain both phase and amplitude information is collected and projected onto a display surface. The present invention specifically focuses on the internal surface of the finger for detection of the liveliness of the finger through coherent gating system.

Another such technology has been disclosed in U.S. Pat. No. 10,719,688B2 that relates to a frustrated total internal reflection fingerprint detector which involves a bank of light emitting diodes which are centered about a plurality of wavelengths, a low profile prism which includes a first surface highly reflective of light centered about the first and said second wavelengths, and a second surface is coated from a first edge to a midpoint so to be reflective of light at the first wavelength and transmissive of light of the second wavelength, and from the said midpoint to a second edge so to be transmissive of light at the first wavelength and reflective of light at the second wavelength and a detector array, and therein the device provides a fingerprint image. The optical configuration and functionality are different of the above mentioned application in context to the functional/working concept of the present invention.

Therefore, a need exists for an optical detector which is capable to overcome the limitations of biometrics which scan the outer surface of the finger/palm thereof.

OBJECT OF THE INVENTION

The main object of the present invention is to provide an optical fingerprint scanner optics for coherent gating liveness detection.

Another object of the invention is to provide a less expensive optical detector in consideration with coherent gating of the internal surface of finger/palm.

Yet another object of the invention is to provide less data analysis in computation as compared to multi-spectral and stereo 3 D optical imagining.

Yet another object of the invention is to provide Zero path difference Michelson interferometer forming image of the internal surface of the finger/palm.

These and other objects will be apparent based on the disclosure herein.

SUMMARY OF THE INVENTION

The present invention relates to optical fingerprint scanner for coherent gating liveness detection involving a first optical path (5A) to capture the fingerprint of the external surface, wherein the finger (4) placed on the prism (5) which gets illuminated by light source (6) and the refracted path (5B) from the finger surface ridges gets collected by imaging lens (7) and lens (8) to form the finger external surface image on two-dimensional photodiode array (9). Further, the electronically processed output data of the photodiode array (9) gives the fingerprint data for the external surface of the finger (4). Furthermore, the second optical path (11A) to capture internal surface of fingerprint, wherein second light source (14) which is adapted to emit broad wavelength band light, first prism (5) being placed at distance to the second light source (14) and having platen surface (1) whereon user finger is placed and non platen surface (2) on another side, lens (13) located in line between the light source and first prism (5), second prism (11) being placed adjacent to first prism (5) wherein beam splitter coating (12) is placed adjacent to second prism (11), a surface image in form of refracted light (11B) hindered by lens (15,16) placed with distance, pin hole (17) placed interjacent to lens (15,16) and two-dimensional detector (18) placed with distance to lens (16). The present invention provides cheap and less complex optical configuration for anti-spoof biometric finger or palm print scanner by using coherent gating image technique of Optical Coherence Tomography (OCT).

The above and other objects and advantages of the present invention are described here under in greater details with reference to following accompanying non-limiting illustrative drawings.

BRIEF DESCRIPTION OF THE DRAWINGS

It should be noted that the figures are not drawn to scale and that elements of similar structures or functions are generally represented by like reference numerals for illustrative purposes throughout the figures. It also should be noted that the figures are only intended to facilitate the description of the preferred embodiments. The FIGURES do not illustrate every aspect of the described embodiments and do not limit the scope of the present disclosure.

Other objects, advantages and novel features of the invention will become apparent from the following detailed description of the present embodiment when taken in conjunction with the accompanying drawings.

FIG. 1: illustrates the optical path of the present invention for simultaneous external and internal finger print imaging.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The FIGURES do not illustrate every aspect of the described embodiments and do not limit the scope of the present disclosure.

DETAILED DESCRIPTION OF THE INVENTION

The nature of the invention and the manner in which it works is clearly described in the specification. The invention has various embodiments and they are clearly described in the following pages of the specification. Before explaining the present invention, it is to be understood that the invention is not limited in its application.

The biometric measurements may provide strong assurance of a person's identity, as well as of the authenticity of the biometric sample being taken, and may be incorporated within a number of different types of devices, such as cellular telephones, personal digital assistants, laptop computers, and other portable electronic devices, as well as stand-alone devices for physical or logical access. The common characteristic of the methods and systems of the present invention is the application of multiple distinct optical configurations used to collect a plurality of image data during a single illumination session. In some instances, methods and systems are provided for the collection and processing of data using a sensor with two distinct imaging systems. In other instances, the methods and systems disclosed pertain to data collected using a sensor with a single camera.

The invention has been explained in relation to specific embodiment. It is inferred that the foregoing description is only illustrative of the present invention and it is not intended that the invention be limited or restrictive thereto. Many other specific embodiments of the present invention will be apparent to one skilled in the art from the foregoing disclosure.

The present disclosure gives an overview of an optical coherent gating based internal fingerprint detection feature provided in the conventional optical fingerprint scanner.

As shown in FIG. 1, it illustrates the schematic view of the optical detector. The said optical scanner (3) as shown in FIG. 1 illustrates the finger (4) of user placed on the platen surface (1) of prism (5) which gets illuminated by light source (6) to form a first optical path (5A) to capture the fingerprint of the external surface and the refracted path (5B) from the finger surface ridges gets collected by imaging lens (7) and lens (8) to form the finger external surface image on two dimensional photodiode array (9). Further, the electronically processed output data of the photodiode array (9) gives the fingerprint data for the external surface of the finger (4). The detector (9) provides the external finger or palm print data.

Now, the FIG. 1 also describes an optical fingerprint scanner (3) illustrates the second optical path (11A) to capture the fingerprint of the internal surface, second light source (14) which is adapted to emit a broad wavelength band light, a first prism (5) being placed at a distance to the second light source (14) and having a platen surface (1) whereon a user finger is placed and a non platen surface (2A) on another side of the first prism (5), a lens (13) located in line between the light source and the first prism (5), a second prism (11) being placed adjacent to the first prism (5) wherein a beam splitter coating (12) is placed adjacent to the second prism (11) on the non platen surface (2B) of the first prism (5), the refracted light (11B) passed through lens (15,16) placed with distance, a pin hole (17) placed interjacent to the lens (15,16) and a two-dimensional detector (18) placed with a distance to lens (16).

The optical path as shown in FIG. 1 describes the process according to the present invention. The FIG. 1 describes the coherent gating based internal surface imaging of the finger (4). The finger (4) of a user is placed on the platen surface (1) of the first prism (5). Further, second light source (14) emits a broad wavelength band light which gets collimated by interfering with the lens (13) placed at distance to the second light source (14) then this collimated second optical path (11A) is hindered by the second prism (11) which is accompanied by the beam splitter coating (12) placed on the non platen surface (2B) of first prism (5) to form a second optical path (11A) to capture the fingerprint of the internal surface from where the light splits into two beams towards the first prism (5) forming an interferometric path for coherent gating image of the preselected internal surface plane (10) of finger (4). The surface image in the form of refracted light (11B) is then hindered with the lens (15, 16) which is placed at a distance which is interjacent with the pin hole (17) which forms the surface image of the internal surface plane (10) on two-dimensional array detector (18). The image signal obtained by two-dimensional detector (18) reflects the spatial micro profile depth or reflectance properties of the preselected internal surface plane (10) of the user finger (4).

The second optical path (11A) shown in FIG. 1 captures the internal finger or palm print inside the skin surface, which is shown as internal surface plane (10) of the finger or palm (4).

Michelson interferometer configuration formed in FIG. 1 in the second optical path (11A) with wide wavelength band second light source (14) and beam splitter coating (12) on the second prism (11) produces a coherent gating image for the internal surface (10) on the image detector (18). Electronic output of the photo array detector (18) provides the internal surface image (10) of the finger (4).

Further, all the wavelengths interfere constructively for the preselected internal surface (10) and the imaging system with lens (15), pin-hole (17), and lens (16) forms surface image of the internal surface (10) on the two-dimensional photo array detector (18).

Furthermore, the spatial micro profile depth variations or reflectance variations of the internal surface (10) produces irradiance variations in the image produced on photo array detector (18). Image signal obtained by photo detector array (18) reflects the spatial micro profile depth or reflectance properties of the preselected internal surface (10) of the finger (4).

Now, the FIG. 1 describes an optical fingerprint scanner (3) illustrating the combination of both optical path (5A, 5B) and (11A, 11B) resulting in live detection. According to the present invention, as shown in FIG. 1, it illustrates the prism (5) on which the user finger (4) is placed, the light source (6) to form a first optical path (5A) to capture the fingerprint of the external surface and the scattered light from the finger surface ridges gets collected by imaging lens (7) and lens (8) on two-dimensional photodiode array (9). Further, the Second prism (11) with beam splitter coating (12) placed on the non platen surface (2B) attached to the prism (5) forms an interferometric path for coherent gating image for the preselected internal surface plane (10) of the finger (4). Broad wavelength band light from the second light source (14) gets collimated by lens (13) and splits into two beams by coating (12). The two beams interfere on surface coating (12) after reflected from the platen surface (1) of second prism (11) and preselected internal surface (10) of the finger (4).

Furthermore, the optical scanner (3) as illustrated in FIG. 1 shows the first optical path (5A) to capture the live detection of fingerprint, wherein the finger (4) placed on the prism (5) which gets illuminated by light source (6) to form a first optical path (5A) to capture the fingerprint of the external surface and the refracted path (5B) from the finger surface ridges gets collected by imaging lens (7) and lens (8) to form the finger external surface image on two-dimensional photodiode array (9). Further, the electronically processed output data of the photodiode array (9) gives the fingerprint data for the external surface of the finger (4). The detector (9) provides the external finger or palm print data with the conventional optical configuration. The present invention as illustrated in FIG. 1 also describes the second light source (14) emits a broad wavelength band light which gets collimated by interfering with the lens (13) placed at distance to the second light source (14) then this collimated second optical path (11A) is hindered by the second prism (11) which is accompanied by the beam splitter coating (12) placed on the non platen surface (2B) of the first prism (5) to form a second optical path (11A) to capture the fingerprint of the internal surface from where the light splits into two beams towards the first prism (5) forming an interferometric path for coherent gating image of the preselected internal surface plane (10) of finger (4). The surface image in the form of refracted light (11B) is then hindered with the lens (15, 16) which is placed at a distance which is interjacent with the pin hole (17) which forms the surface image of the internal surface plane (10) on two-dimensional array detector (18). The image signal obtained by two dimensional detector (18) reflects the spatial micro profile depth or reflectance properties of the preselected internal surface plane (10) of the user finger (4).

All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

LIST OF REFERENCE NUMERALS

1 Platen surface
2A Non-platen surface
2B Non-platen surface
3 Optical scanner
4 Finger
5 First prism
5A First optical path
5B refracted path
6 Light source
7 Imaging Lens
8,13, 15, 16 Lens
9 Photodiode array
10 Internal surface plane
11 Second prism
11A Second optical path
11B refracted light
12 Beam splitter coating
14 second light source
17 Pin-hole
18 Photo detector array

We claim:

1. An optical fingerprint scanner for optical coherent gating liveness detection, comprising;
   a platen surface of a first prism configured to receive a finger of a user placed on the platen surface of the first prism illuminated by a first light source to form a first optical path to capture a fingerprint of an external surface of the finger and a refracted path from finger surface ridges collected by imaging lenses to form a finger external surface image on a two-dimensional photodiode array;
   a second light source configured to emit a broad wavelength band light, the first prism being placed at a distance to the second light source, a collimating lens located in line between the second light source and the first prism, a second prism being placed adjacent to the first prism wherein a beam splitter coating is placed adjacent to the second prism on a non-platen surface of the first prism to form a second optical path to capture a fingerprint of an internal surface of the finger, refracted light passed through additional lenses placed with distance, a pin hole placed interjacent to the additional lenses and a two-dimensional detector placed with a distance to one of the additional lenses;
   wherein the broad wavelength band light from the second light source gets collimated by the collimating lens splitting into two beams by the beam splitter coating.

2. The optical fingerprint scanner for optical coherent gating liveness detection as claimed in claim 1, wherein an image signal obtained by a photodetector array of the two-dimensional detector reflects a spatial micro profile depth or reflectance properties of a preselected internal surface of the finger.

3. A method for detecting optical coherent gating liveness through an optical fingerprint scanner comprising the following steps:
   a) placing of finger of a user on a platen surface of a first prism;
   b) illuminating from a light source to form a first optical path to capture a fingerprint of an external surface of the finger and a refracted path from finger surface ridges collected through imaging lenses;

c) forming a finger external surface on a two-dimensional photodiode array;

d) providing fingerprint data for an external surface of the finger through electronically processed output data of the two-dimensional photodiode array;

e) emitting a broad wavelength band second light source which gets collimated by interfering with a collimating lens placed at distance to the broad wavelength band second light source to form a second optical path and a collimated second optical path;

f) hindering the collimated second optical path received in step (e) by a second prism which is accompanied by a beam splitter coating placed on a non-platen surface of the first prism from where the light splits into two beams of splitted light;

g) forming an interferometric path of the splitted light obtained in step (f) for a coherent gating image of a preselected internal surface plane of the finger, the surface image in a form of a refracted path hindered with additional lenses placed at a distance interjacent with a pinhole on a two-dimensional array detector;

h) obtaining an image signal by the two-dimensional array detector reflecting a spatial micro profile depth or reflectance properties of the preselected internal surface plane of the finger; and i) detecting a final image of the finger from data collected through the two-dimensional photodiode array and the two-dimensional array detector.

* * * * *